Figure 4:
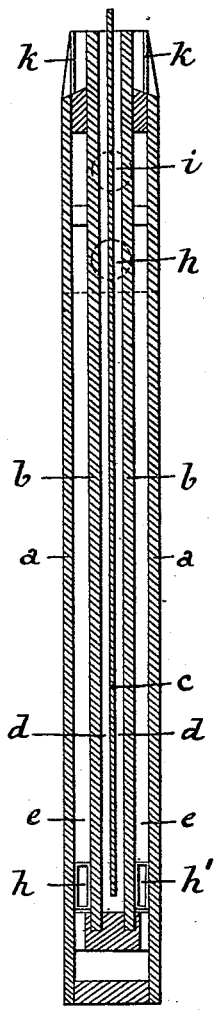

(No Model.) 2 Sheets—Sheet 1.
E. ORTELLI.
ELECTRIC BATTERY.
No. 470,073. Patented Mar. 1, 1892.
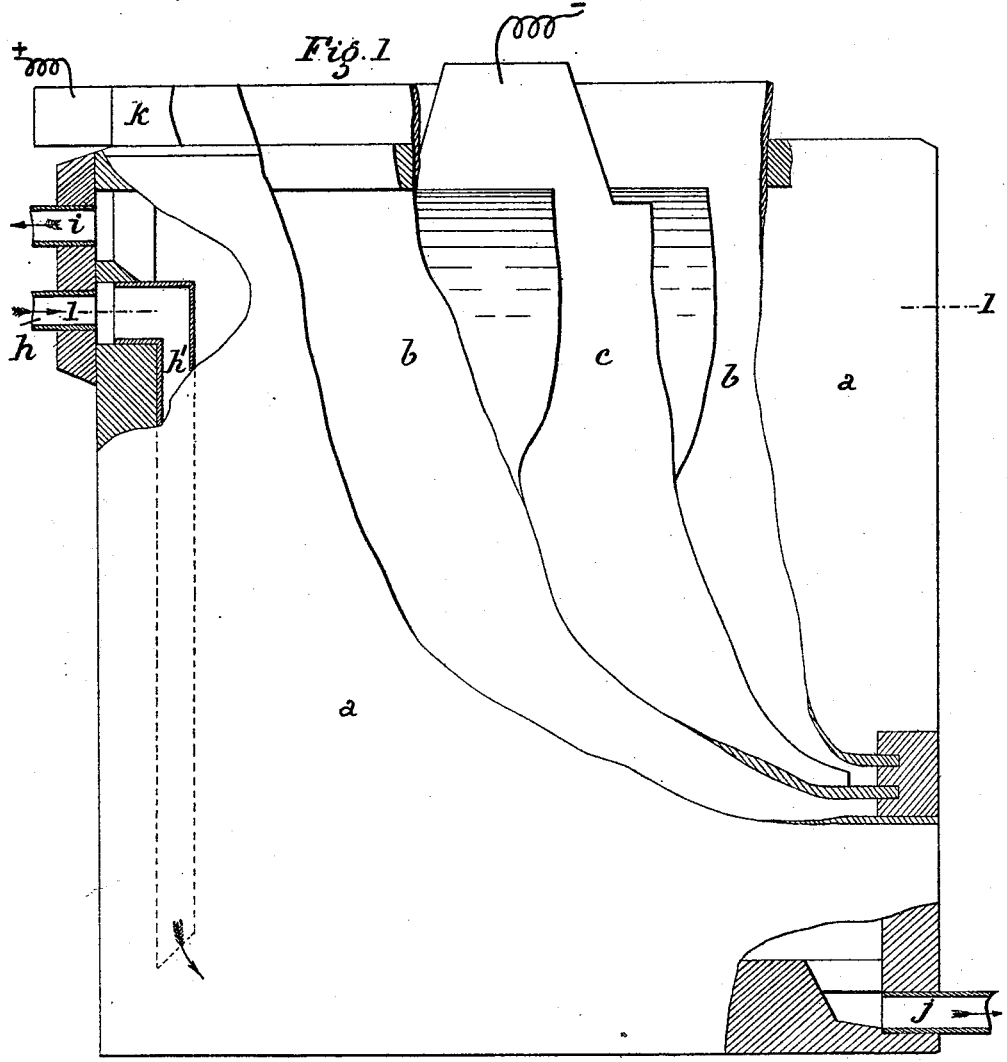
Fig. 1
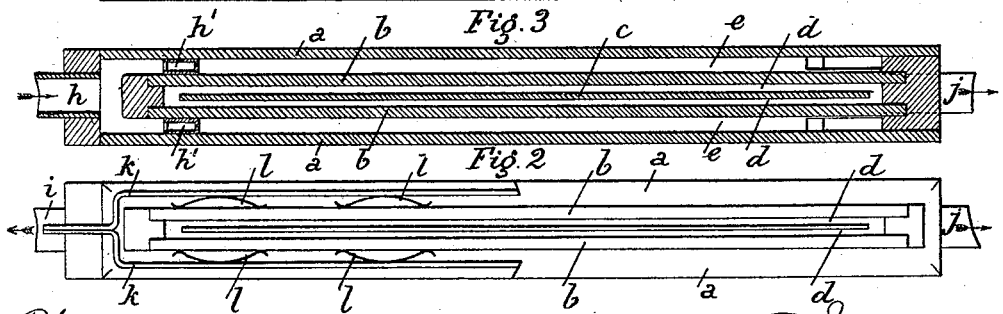
Fig. 3
Fig. 2

(No Model.) 2 Sheets—Sheet 2.

E. ORTELLI.
ELECTRIC BATTERY.

No. 470,073. Patented Mar. 1, 1892.

Witnesses:—
J. A. Rutherford.
Geo. W. Rea.

Inventor:
Erminio Ortelli
By James L. Norris
Attorney

UNITED STATES PATENT OFFICE.

ERMINIO ORTELLI, OF CADENABBIA, ITALY.

ELECTRIC BATTERY.

SPECIFICATION forming part of Letters Patent No. 470,073, dated March 1, 1892.

Application filed September 18, 1890. Serial No. 365,392. (No model.)

*To all whom it may concern:*

Be it known that I, ERMINIO ORTELLI, civil engineer, a subject of the King of Italy, residing in Cadenabbia, Province of Como, Italy, have invented a certain new and useful Improvement in Primary Electric Piles; and I do hereby declare that the following is a full, clear, and exact description thereof.

The principle upon which my pile or battery is based resides in the property which the metalloids of the first group—viz., bromine, chlorine, flourine, and iodine—have of uniting with hydrogen and forming therewith at an ordinary temperature strong acids, which are very soluble in water and which attack almost all metals, thereby producing hydrogen. Any one of the four metalloids hereinbefore mentioned will answer the purpose equally well. For the purpose of the present specification, however, I will refer to chlorine and term it the "gas."

The objects I have in view by the employment of my invention are to produce a battery which will have an electro-motive force of an absolute constancy, which will give a current of high intensity, which will have but a weak and constant internal resistance, which will consume cheaply, which in its chemical action will always be proportionate to the work performed, and will consequently give rise to no consumption when it is in an open circuit, and, finally, which will have but a very small dead-weight.

I will proceed to fully describe the arrangement of the battery proper, and then the chemical actions which take place.

Figure 1 is a longitudinal sectional elevation of the battery, partly broken away. Fig. 2 is a top view of Fig. 1. Fig. 3 is a plan of Fig. 1 in section on the line 1 1. Fig. 4 is a vertical section taken through the middle of Fig. 1, looking from right to left.

Referring to Figs. 1 to 4, inclusive, $a$ is an outer casing or vessel made of any suitable material, but which I prefer making of wood, compressed wood pulp, paper-pulp, or like light substance rendered impervious by a coating of paraffine or other convenient substance.

$b$ is the carbon vessel.

$c$ is the amalgamated zinc plate, which is insulated from the carbon vessel $b$ in any suitable manner, as by means of a string or rubber band coated with or dipped in paraffine or some other insulating substance.

$d$ is the chamber for receiving a solution of hydrochlorate of ammonia.

$e$ is the depolarizing-chamber for the carbon vessel $b$, which serves at the same time as a porous vase and depolarizing-plate.

$h$ is the inlet for the gas into the chamber $e$. The inlet $h$ has two branches $h'$ for leading the gas into the depolarizing-chamber $e$.

$i$ is the outlet for air and for any excess of gas from the chamber $e$. The said outlet is connected to any suitable known device (not shown) for absorbing the gas and preventing its escape into the open air.

$j$ is the outlet or discharge for the liquid solution, which may permeate through the carbon vessel $b$. The said solution may be collected and employed afresh.

$k$ is a fork of amalgamated zinc or other suitable substance for establishing a contact with the carbon vessel $b$. Said contact is obtained by placing between the fork $k$ and the carbon vessel $b$ strips of copper or other suitable springy metal, (shown at $l$, Fig. 2.)

The contact-strips $l$ can be readily removed by hand when cleaning requires to be effected.

The fork $k$ may be amalgamated in order to prevent it from oxidizing too readily in case it should become stained with the liquid.

Operation: The carbon vessel $b$ being charged with hydrochlorate of ammonia and the admission of gas being effected through the inlet $h$ and the negative and positive poles of the pile being connected, the following chemical reactions will be produced: The hydrochlorate of ammonia is decomposed into chlorine and ammonium. The chlorine attacks the zinc and forms chloride of zinc, which dissolves. The hydrogen which evolves from the hydrochlorate of ammonium settles on or about the inner walls of the carbon vessel $b$ and combines with the gas fed into the battery through the inlet $h$, whereby hydrochloric acid is formed. In its turn the hydrochloric acid forms with the free ammonia a fresh chloride of ammonium. The latter again attacks the zinc, and the hereinbefore-described reaction is repeated and continued as long as the above-mentioned elements are in presence. A chemical cycle is thus created, whereby an electrical current is produced which is constant. Consequently as fast as the hydrogen gas is formed it is not only absorbed, so to speak, instantaneously, but it is utilized in the chemical reaction above set forth. Thus, owing to the fact that the hydrogen gas does not remain any appreciable length of time upon or about the carbon plates of $b$, it follows that no partial insulation of the said plates ever takes place. On the other hand, I obtain as a further result a regular and uniform consumption of the zinc surface.

Instead of pouring the hydrochlorate of ammonia into the carbon vessel $b$, I can soak any suitable textile or capillary material with the said hydrochlorate and place the so soaked material between the walls of the carbon vessel $b$.

One of the essential novel features of the hereinbefore-described battery consists in the employment of chlorine gas or any of the equivalents set forth, in combination with hydrochlorate of ammonia, as a means for generating a current of electricity.

Another essential novel feature lies in the fact that the carbon vessel $b$ acts simultaneously as a depolarizing-plate and porous vase.

Another essential novel feature lies in the fact that the space through which the chlorine gas circulates is not filled with granulated charcoal and is absolutely devoid of any filling whereby the said gas can readily circulate, while at the same time the weight of the element is reduced.

If instead of employing chlorine, which I prefer as being cheaper than bromine, flourine, and iodine, I were to employ any one of the latter three equivalents, the same result as that above set forth is obtained.

I claim—

1. A galvanic battery comprising an outer impervious casing $a$, inclosing a depolarizing-chamber $e$, having a gas-inlet $h$, a gas and air outlet $i$, and an outlet $j$ for liquid, a carbon vessel $b$, containing hydrochlorate of ammonia and serving as a porous vase and depolarizing-plate, said vessel being placed in the depolarizing-chamber, and a zinc plate $c$, placed in said carbon vessel, substantially as described.

2. A galvanic battery composed, essentially, of an outer casing $a$, made of wood, compressed wood pulp, paper-pulp, or like light substance, which is rendered impervious by means of paraffine or other suitable substance, a carbon vessel $b$, containing a solution of hydrochlorate of ammonia, together with an insulated zinc plate $c$, an inlet $h$ for the gas, an outlet $i$ for the air and gas, an escape $j$ for the liquid solution which may permeate through the carbon vessel $b$, a fork $k$, and contact-strips $l$, substantially as described and shown.

In witness whereof I have hereunto signed my name in the presence of two subscribing witnesses.

ERMINIO ORTELLI.

Witnesses:
R. H. BRANDON,
A. H. RAPP.